US012795232B2

(12) United States Patent
Kitai

(10) Patent No.: US 12,795,232 B2
(45) Date of Patent: Nov. 10, 2026

(54) IMAGING APPARATUS AND METHOD FOR CONTROLLING IMAGING APPARATUS

(71) Applicant: CANON KABUSHIKI KAISHA, Tokyo (JP)

(72) Inventor: Shimpei Kitai, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 19/184,322

(22) Filed: Apr. 21, 2025

(65) Prior Publication Data

US 2025/0373940 A1 Dec. 4, 2025

(30) Foreign Application Priority Data

May 31, 2024 (JP) ................................ 2024-089317

(51) Int. Cl.
*H04N 23/667* (2023.01)
*H04N 23/60* (2023.01)
*H04N 23/62* (2023.01)
*H04N 23/63* (2023.01)

(52) U.S. Cl.
CPC .......... *H04N 23/667* (2023.01); *H04N 23/62* (2023.01); *H04N 23/633* (2023.01); *H04N 23/64* (2023.01)

(58) Field of Classification Search
CPC ...... H04N 23/62; H04N 23/63; H04N 23/633; H04N 23/634; H04N 23/667
USPC .................................................... 348/333.02
See application file for complete search history.

(56) References Cited

U.S. PATENT DOCUMENTS

2019/0364198 A1* 11/2019 Wakabayashi ....... H04N 23/667
2020/0137296 A1* 4/2020 Okada .................. H04N 23/667
2025/0287093 A1* 9/2025 Lee ......................... H04M 1/02

FOREIGN PATENT DOCUMENTS

EP 1398959 A2 * 3/2004 ............. H04N 23/62
JP 2005260792 A 9/2005

* cited by examiner

*Primary Examiner* — Anthony J Daniels

(74) *Attorney, Agent, or Firm* — Cowan, Liebowitz & Latman, P.C.

(57) ABSTRACT

An imaging apparatus includes: a first operation member configured to change first setting; a processor; and a memory storing a program which, when executed by the processor, causes the imaging apparatus to: execute notification processing for displaying notification information that notifies a user that second setting different from the first setting is changed in a case where the second setting is changed by changing the first setting, and execute control processing for performing control so as to change the first setting, according to an operation on the first operation member in a state where the notification information is not displayed and performing control so as to end display of the notification information, without changing the first setting, according to the operation on the first operation member in a state where the notification information is displayed.

16 Claims, 7 Drawing Sheets

IMAGING APPARATUS AND METHOD FOR CONTROLLING IMAGING APPARATUS

BACKGROUND OF THE INVENTION

Field of the Invention

The present invention relates to an imaging apparatus and a method for controlling the imaging apparatus.

Description of the Related Art

In recent years, with an increase in a size of an imaging device of an imaging apparatus (camera), a camera that has a sensor reading mode switching function for changing a reading size from the imaging device at the time of imaging has been known. The camera having the sensor reading mode switching function can switch an imaging angle of view without using a lens having a zoom function.

Similarly, as the function for switching the imaging angle of view, a digital zoom function has been known. In the switching of the imaging angle of view using the digital zoom function, processing such as enlargement of a cutout image is executed. Therefore, there is a possibility that image quality is deteriorated. On the other hand, in the switching of the imaging angle of view using the sensor reading mode switching function, since the processing such as enlargement is not executed, it is possible for a user to perform imaging without worrying about the deterioration in the image quality.

The sensor reading mode can be switched by an operation in a menu having a conventional hierarchical structure. Furthermore, the sensor reading mode is not limited to a case where switching is performed by the operation in the menu, and switching can be performed by operating a specific key to which the sensor reading mode switching function is assigned. That is, the user can change the imaging angle of view, by switching the sensor reading mode by the operation for pressing the specific key.

While the switching of the sensor reading mode is useful for changing the imaging angle of view at the time of imaging, there is a case where a resolution of an image to be captured is limited, because the reading size from the imaging device is changed. For example, in a case where the reading size from the imaging device is a 4K size, imaging with a 4K resolution can be performed. However, in a sensor reading mode in which the reading size is a 2K size, a resolution of an image that can be captured is 2K. In a case where the user switches the sensor reading mode to change the imaging angle of view, even if the resolution is changed to a resolution that is not intended by the user in conjunction with the switching, there is a possibility that the user does not notice.

In order to make the user aware that the resolution is changed, a method for notifying that the resolution has been changed has been known. Japanese Patent Application Publication No. 2005-260792 discloses a digital camera that determines an imaging mode in response to a pressing operation of a shutter button and displays a warning in a case where a specific imaging mode is set.

SUMMARY OF THE INVENTION

The present invention provides an imaging apparatus that can perform notification without impairing operability.

An imaging apparatus according to the present invention includes: a first operation member configured to change first setting; a processor; and a memory storing a program which, when executed by the processor, causes the imaging apparatus to: execute notification processing for displaying notification information that notifies a user that second setting different from the first setting is changed in a case where the second setting is changed by changing the first setting, and execute control processing for performing control so as to change the first setting, according to an operation on the first operation member in a state where the notification information is not displayed and performing control so as to end display of the notification information, without changing the first setting, according to the operation on the first operation member in a state where the notification information is displayed.

Further features of the present invention will become apparent from the following description of exemplary embodiments with reference to the attached drawings.

DESCRIPTION OF THE EMBODIMENTS

Figure 1:
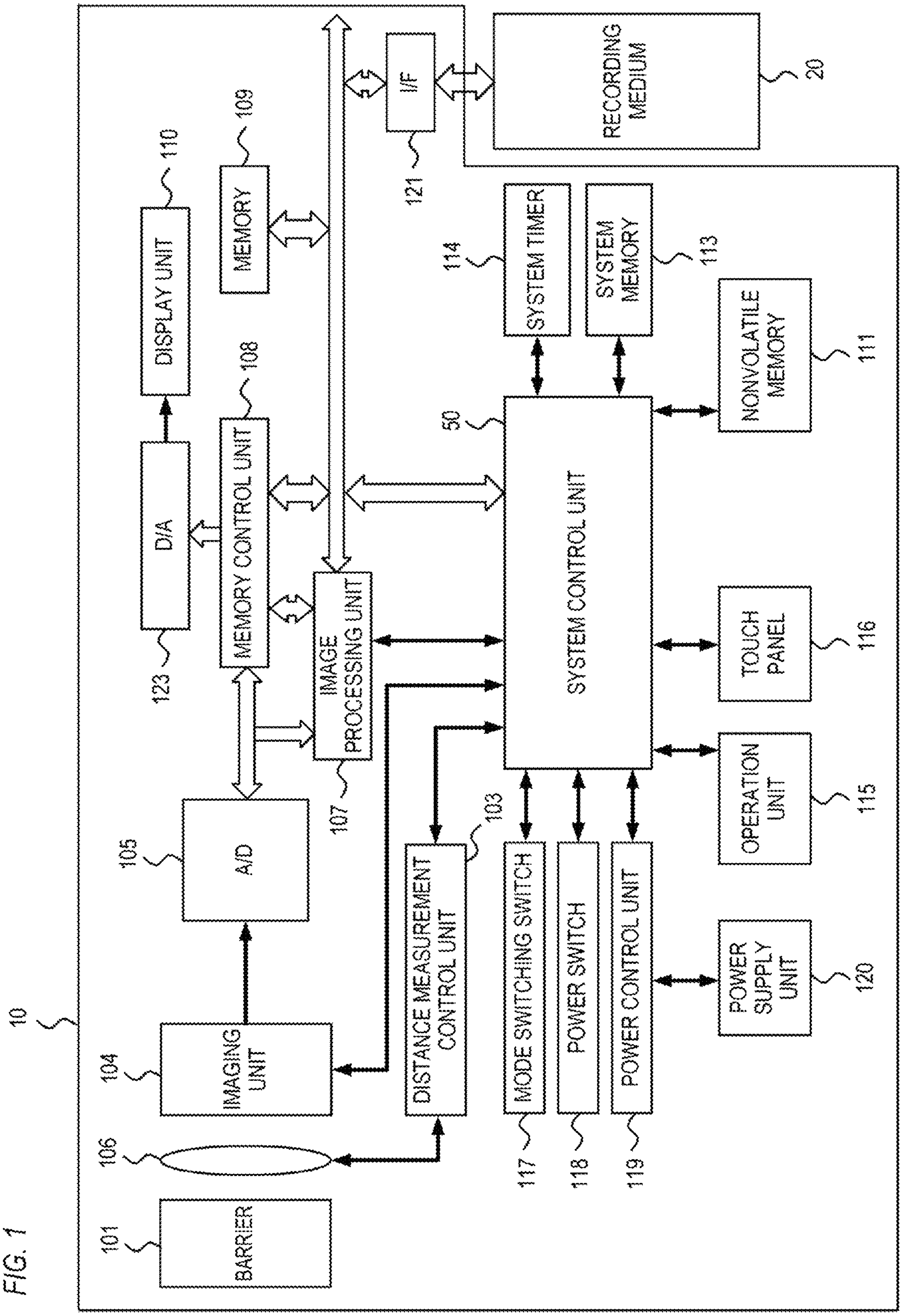
FIG. 1 is a diagram illustrating a configuration of a camera.

Hereinafter, an embodiment of the present invention will be described with reference to the drawings. FIG. 1 is a block diagram illustrating a configuration of a digital video camera (camera) 10 as an example of an imaging apparatus according to the present invention.

The camera 10 includes a barrier 101, an imaging lens 106, a distance measurement control unit 103, an imaging unit 104, an A/D converter 105, a memory control unit 108, an image processing unit 107, a memory 109, a D/A converter 123, a display unit 110, and a system control unit 50.

The imaging lens 106 is a lens group including a focus lens. The focus lens is a lens that performs focusing. The barrier 101 prevents contamination or damage of an imaging system by covering the imaging system including the imaging lens 106 of the camera 10. The distance measurement control unit 103 controls the focus lens.

The imaging unit 104 is an imaging device (image sensor) including a CCD and a CMOS device that convert an optical image into an electric signal. Furthermore, the imaging unit 104 can control an exposure time of the imaging device, according to a shutter speed settable as an exposure control value related to the imaging device. The A/D converter 105 converts an analog signal output from the imaging unit 104 into a digital signal.

The image processing unit 107 executes predetermined processing (pixel interpolation, resizing processing such as reduction, color conversion processing, and the like) on image data from the A/D converter 105 or image data from the memory control unit 108. Furthermore, the image processing unit 107 executes predetermined arithmetic processing using the captured image data, and the system control unit 50 performs exposure control and distance measurement control based on the obtained arithmetic result. Through this processing, through-the-lens (TTL) type autofocus (AF) processing, auto exposure (AE) processing, flash pre-emission (EF) processing, and the like are performed.

The image data from the A/D converter 105 is written into the memory 109 via the image processing unit 107 and the memory control unit 108. Alternatively, the image data from the A/D converter 105 is written into the memory 109 via the memory control unit 108, not via the image processing unit 107. The memory 109 stores image data obtained by the imaging unit 104 and converted by the A/D converter 105 into digital data and image data to be displayed on the display unit 110. The memory 109 has a storage capacity sufficient to store a predetermined number of still images or a moving image and voice in a predetermined time. Furthermore, the memory 109 also serves as a memory (video memory) for image display when image data read from a recording medium 20 and on-screen display (OSD) data is displayed on the display unit 110.

The D/A converter 123 converts the image data for display stored in the memory 109 into an analog signal and supplies the analog signal to the display unit 110. Therefore, the image data for display written into the memory 109 is displayed by the display unit 110 via the D/A converter 123.

The display unit 110 performs display according to the analog signal from the D/A converter 123. The display unit 110 is, for example, a display such as a liquid crystal display (LCD) or an organic electroluminescence (EL). The digital signal A/D converted by the A/D converter 105 and accumulated in the memory 109 is converted into the analog signal by the D/A converter 123, and is sequentially transferred to and displayed on the display unit 110. As a result, a function as an electronic viewfinder is realized, and a live view image is displayed on the display unit 110. Although the display unit 110 is an electronic viewfinder, the display unit 110 may be a small (for example, 3.5 inch) liquid crystal monitor or may be an external output terminal compatible with the HDMI (registered trademark) standard, the SDI standard, or the like. Furthermore, the display unit 110 may include the plurality of displays or external output terminals.

The system control unit 50 is a control unit including at least one processor and/or at least one circuit. That is, the system control unit 50 may be a processor, a circuit, or a combination of a processor and a circuit. The system control unit 50 controls the entire camera 10. Furthermore, the system control unit 50 performs display control by controlling the memory 109, the D/A converter 123, the display unit 110, or the like.

Furthermore, the camera 10 includes a nonvolatile memory 111, a system memory 113, a system timer 114, an operation unit 115, a touch panel 116, a mode switching switch 117, a power switch 118, a power control unit 119, a recording medium I/F 121, and the recording medium 20.

The nonvolatile memory 111 is an electrically erasable and recordable memory and is, for example, an EEPROM (registered trademark). In the nonvolatile memory 111, constants, programs, and the like for an operation of the system control unit 50 are recorded. The program includes programs for performing various flowcharts described below. The system control unit 50 implements each processing in the flowcharts described below, by executing the programs recorded in the nonvolatile memory 111.

The system memory 113 is, for example, a random-access memory (RAM). In the system memory 113, for example, constants, variables, and programs read from the nonvolatile memory 111 for the operation of the system control unit 50 are loaded. The system timer 114 is a timer unit that counts time used for various controls and time of a built-in clock.

The operation unit 115 is an input unit (receiving unit) that can receive an operation from a user (user operation) and is an operation member used to input various instructions to the system control unit 50. The operation unit 115 includes buttons such as a SET key (determination button), a direction key (up key, down key, left key, and right key), a menu button, a cancel button, or an AF/MF switching button. For example, the menu button is an operation member that is pressed to display a menu screen, which enables various settings, on the display unit 110. The user can intuitively perform various settings, using the menu screen, the direction key, and the SET key displayed on the display unit 110.

Furthermore, the operation unit 115 is not limited to the button and may include a dial such as a main dial or a sub dial. For example, the main dial is a rotary operation member used to change a setting value such as a shutter speed.

Furthermore, the operation unit 115 includes an assignment button to which a specific operation (function) can be assigned. The function assigned to the assignment button may be assigned in advance or may be assigned by a user operation.

The function assigned to the assignment button can be changed according to an operation on the menu screen. In a case where a specific function is assigned to the assignment button, the user can operate the camera 10 or change setting, according to the specific function assigned to the assignment button, by pressing the assignment button. For example, in a case where a sensor reading mode switching function for changing a sensor reading size is assigned to the assignment button, the user can change setting of the sensor reading mode, by pressing the assignment button. Hereinafter, the sensor reading mode is also described as a sensor mode.

The touch panel 116 is a touch sensor for detecting various touch operations on a display surface of the display unit 110 (operation surface of touch panel 116). The touch panel 116 and the display unit 110 can be integrally configured. For example, the touch panel 116 is attached to an upper layer of the display surface of the display unit 110 so that a transmittance of light does not hinder the display on the display unit 110. Input coordinates on the touch panel 116 are associated with display coordinates on the display surface of the display unit 110. In this way, the touch panel 116 can provide a graphical user interface (GUI) as if the user can directly operate the screen displayed on the display unit 110.

The mode switching switch 117 is an operation member used to switch various modes. The mode switching switch 117 switches, for example, an operation mode of the system control unit 50 to any one mode of a moving image recording mode, a reproduction mode, or the like.

The power switch 118 is an operation member for switching on/off of a power supply of the camera 10. The power control unit 119 includes a battery detection circuit, a DC-DC converter, a switch circuit that switches a block to be energized, and the like, and detects whether or not a battery is mounted, the type of battery, a remaining battery level, and the like. Furthermore, the power control unit 119 controls the DC-DC converter based on a detection result and an instruction of the system control unit 50 and supplies power to be used in an operation period of each unit, to each unit including the recording medium 20. A power supply unit 120 is a primary battery such as alkaline and lithium batteries, a secondary battery such as NiCd, NiMH, and Li batteries, or an AC adapter.

The recording medium I/F 121 is an interface to the recording medium 20 such as a memory card or a hard disk. The recording medium 20 is a memory card or the like for recording a captured image and includes a semiconductor memory, a magnetic disk, or the like. The recording medium 20 may be attachable to and detachable from the camera 10 or may also be embedded in the camera 10.

Figure 2A:
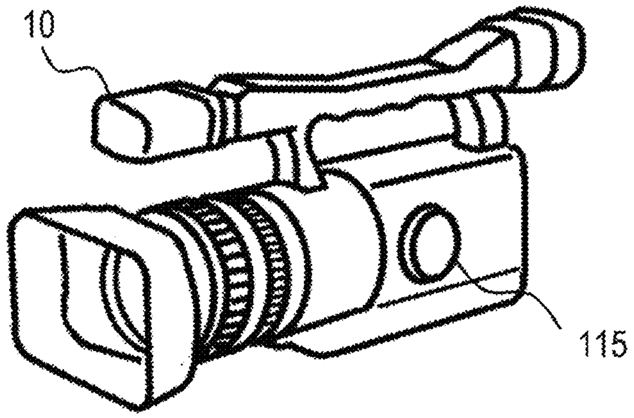
FIGS. 2A to 2C are diagrams for explaining an imaging posture in which the camera is fixed.
Figure 2B:
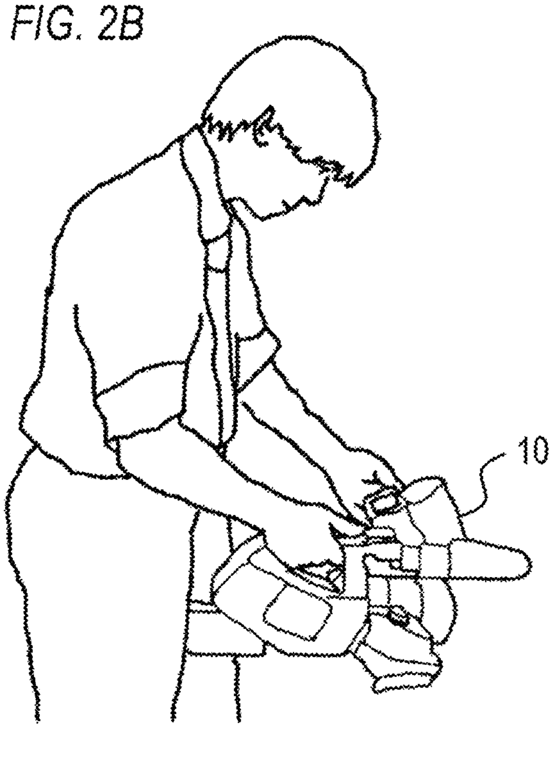
Figure 2C:
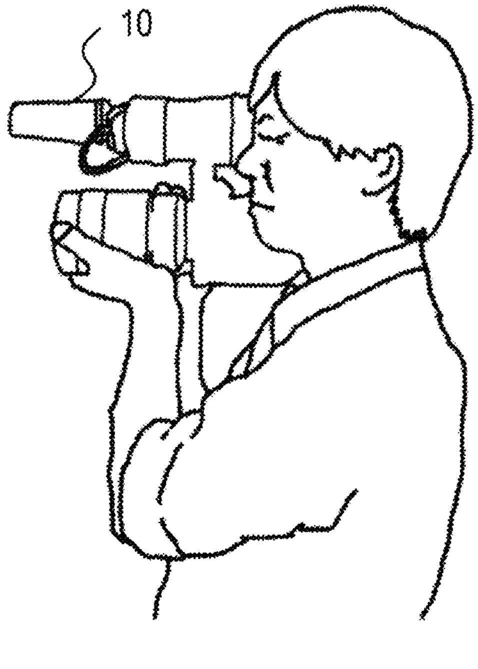

FIGS. 2A to 2C are diagrams for explaining an imaging posture in which the camera 10 is fixed. FIG. 2A is a diagram illustrating an example of an appearance of the camera 10. The operation unit 115 is arranged on an exterior of the camera 10 and may include an operation member such as a button or a dial.

FIG. 2B is a diagram illustrating an example of a posture of the user in low-angle imaging. While holding the exterior, including a handle and a grip, of the camera 10 with both hands, the user performs imaging as viewing an LCD panel included in the display unit 110 or the like. FIG. 2C is a diagram illustrating an example of a posture in imaging in which the camera 10 is placed on a shoulder. While holding the exterior, including a lens portion and the grip, of the camera 10, with both hands, the user performs imaging as viewing a viewfinder or the like included in the display unit 110.

In the imaging posture illustrated in FIGS. 2B and 2C, the user maintains the posture in which the camera 10 is fixed with both hands, so that blurring does not occur in the captured image. Therefore, when settings regarding imaging are changed, it is desirable that the operation member including the button, the dial, and the like included in the operation unit 115 be arranged at a position where at least one hand can reach.

Figure 3A:
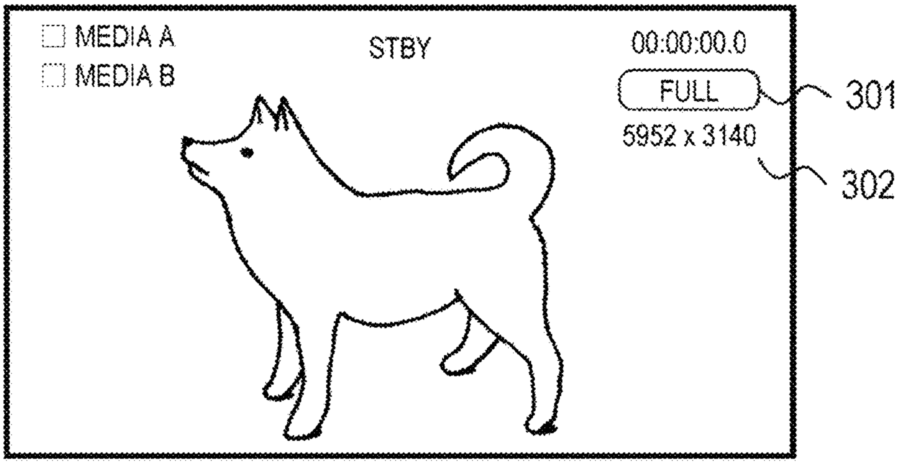
FIG. 3A is a diagram illustrating an example of an imaging screen of the camera.
Figure 3B:
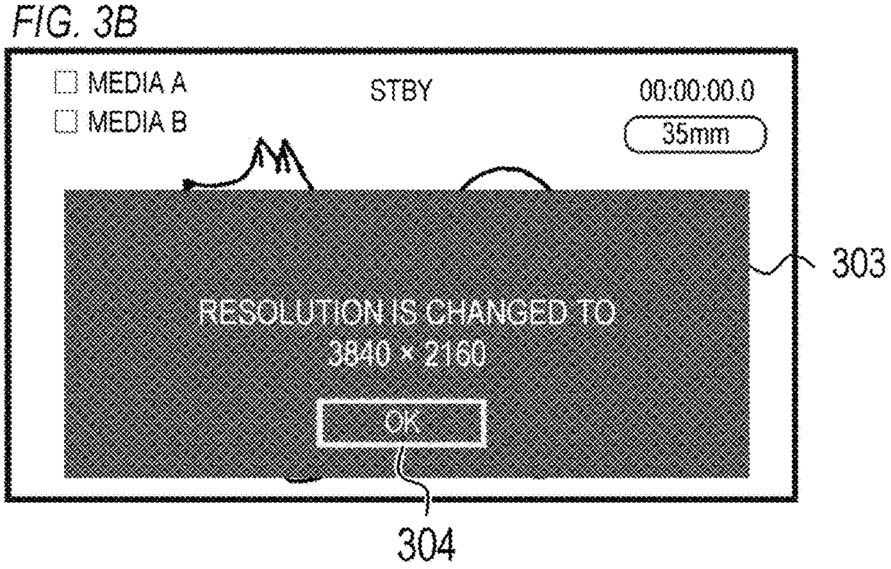
FIG. 3B is a diagram illustrating an example of a notification screen of the camera.
Figure 3C:
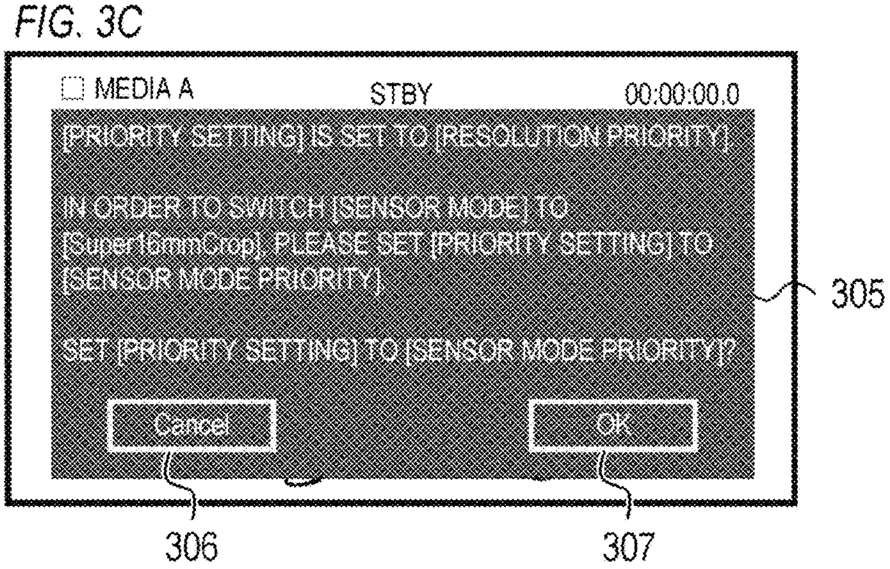
FIG. 3C is a diagram illustrating an example of a confirmation screen of the camera.

FIGS. 3A to 3C are diagrams illustrating an example of an imaging screen, a notification screen, and a confirmation screen displayed on the display unit 110. FIG. 3A illustrates an example of the imaging screen. The display unit 110 can display information regarding imaging on an on-screen display (OSD). In FIG. 3A, an icon 301 indicates a setting value of a currently set sensor mode (sensor reading mode). Furthermore, an icon 302 indicates a setting value of a currently set resolution (imaging resolution).

Figure 4:
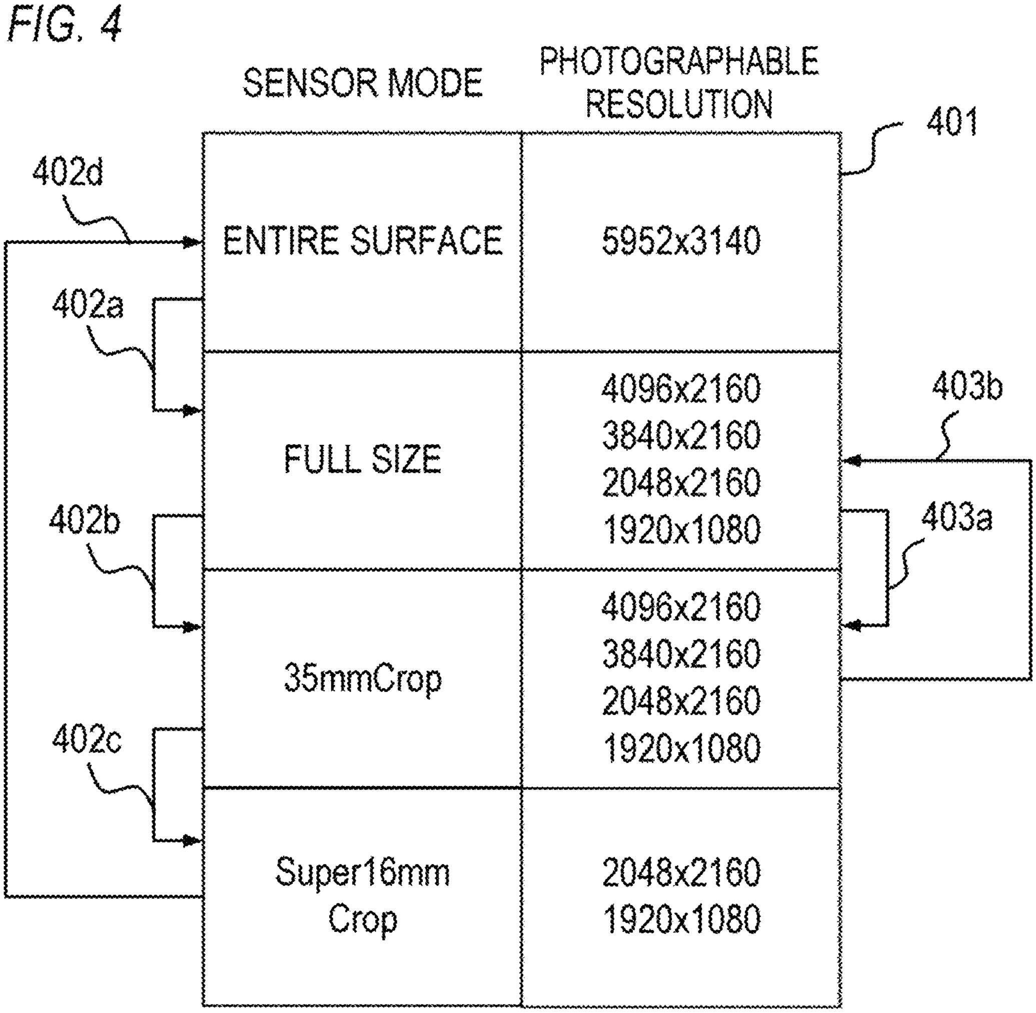
FIG. 4 is a diagram illustrating an example of a sensor mode of the camera.

FIG. 4 is a diagram illustrating an example of the sensor mode. A table 401 illustrates a relationship between the sensor mode and a photographable resolution corresponding to each sensor mode. The user can change setting of the sensor mode, by an operation on the menu screen. An arbitrary setting value is selected using the direction key, from among a plurality of setting values (entire surface, FULL size, 35mmCrop, and Super16mmCrop) of the sensor mode displayed on the menu screen and the SET key is operated so that the setting of the sensor mode can be changed to the selected setting value. Furthermore, the user can change (switch) the setting of the sensor mode, by operating the assignment button to which a sensor mode switching function is assigned. The user can change the setting of the sensor mode by pressing the assignment button. Each time when the user presses the assignment button, the setting value of the sensor mode is sequentially changed from the currently set setting value in a predetermined order of arrows 402*a*, 402*b*, 402*c*, and 402*d* indicating a switching path (switching order).

In a case where a resolution set before the change of the sensor mode is a resolution that does not correspond to the changed sensor mode, the system control unit 50 of the camera 10 automatically changes the setting to a resolution corresponding to the changed sensor mode. Then, the system control unit 50 notifies the user that the resolution is automatically changed.

FIG. 3B is a diagram illustrating an example of a notification screen 303 indicating notification information to the user. The notification screen 303 in FIG. 3B displays notification information for notifying the user that setting of a resolution different from the setting of the sensor mode is changed, by changing the setting of the sensor mode, in response to an operation for changing the setting of the sensor mode.

The notification screen 303 includes an acceptance button 304 (OK button). The notification screen 303 is displayed on the display unit 110, until an operation for selecting the acceptance button 304 is performed by the user. The system control unit 50 can make the user aware that the resolution has been changed, by continuing to display the notification screen 303, until the user makes an acceptance. The acceptance button 304 can be selected (operated) by an operation for pressing the determination button included in the operation unit 115 or the touch operation on the touch panel 116.

In a case where the operation on the assignment button to which the sensor mode switching function is assigned is received and the notification screen 303 (notification information) is displayed, if the system control unit 50 receives the operation on the assignment button again, the system control unit 50 ends the display of the notification screen 303. Then, the system control unit 50 changes the setting of the sensor mode and changes the setting of the resolution according to the changed sensor mode.

Note that, in a case where the system control unit 50 receives the operation for changing the setting of the sensor mode on the menu screen without using the assignment button and the notification screen 303 is displayed, the system control unit 50 may continue to display the notification screen 303, even if the operation on the assignment button is received thereafter. For example, in a case where the user changes the setting of the sensor mode from the menu screen and the notification screen 303 for notifying the user that the resolution is changed is displayed, the display of the notification screen 303 does not end, even if the assignment button to which the sensor mode switching function is assigned. The display of the notification screen 303 ends, in response to the press of the SET button or the touch operation on the acceptance button 304. On the other hand, in a case where the notification screen 303 is displayed by the operation on the assignment button, the display of the notification screen 303 ends by not only the operation on the assignment button but also the press of the SET button or the touch operation on the acceptance button 304.

By making it possible to end the display of the notification screen 303 by pressing the assignment button, the user who fixes the imaging posture and performs imaging as illustrated in FIGS. 2B and 2C can end the notification screen 303 while maintaining the posture. That is, in order to end the notification screen 303, the user does not need to perform the operation on the determination button or the touch panel 116 as re-holding the camera 10. Therefore, a risk of occurrence of blurring in an image can be reduced.

FIG. 3C is a diagram illustrating an example of a confirmation screen 305 for confirming to the user whether or not priority setting indicating the setting of the sensor mode is prioritized or the setting of the resolution is prioritized can be changed, when the sensor mode is switched. The priority setting includes a first priority mode in which the setting of the sensor mode is prioritized and a second priority mode in which the setting of the resolution is prioritized.

In the first priority mode, the system control unit 50 performs control so that the user can select all the setting values of the setting of the sensor mode. On the other hand, in the second priority mode, the system control unit 50 performs control so that the setting value of the sensor mode, in which a current setting value of the resolution is changed by changing the setting value of the sensor mode, of the setting values of the sensor mode is not selected by the user. In the second priority mode, operability for a user who desires to prioritize the resolution (image quality) is improved.

The confirmation screen 305 is displayed in a case where the priority setting is set to resolution priority (second priority mode) and an operation is performed on the assignment button to which the sensor mode switching function is assigned a plurality of times within a predetermined time. The confirmation screen 305 is a screen for confirming to the user whether or not to switch from the second priority mode to the first priority mode.

The predetermined time can be determined in a program stored in the nonvolatile memory 111 in advance, for example. The predetermined time may be determined, for example, based on a time required to press the assignment button, the number of setting values (types) of the sensor mode, or the like. Furthermore, the confirmation screen 305 may be displayed not only in a case where the operation on the assignment button is performed the plurality of times within the predetermined time and also in a case where the operation on the assignment button is performed more than a predetermined number of times within the predetermined time. The predetermined number of times here may be determined, for example, based on the number of types of the sensor mode or the like. Moreover, the confirmation screen 305 may be displayed in a case where the setting of the sensor mode is set to the same setting value a plurality of times, by performing the operation on the assignment button the plurality of times.

Figure 5:
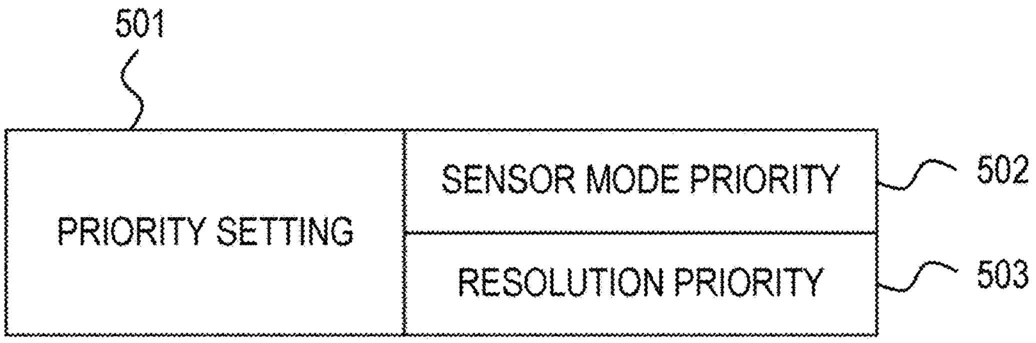
FIG. 5 is a diagram for explaining priority setting when the sensor mode is switched.

FIG. 5 is a diagram for explaining the priority setting when the sensor mode is switched. Priority setting 501 when the sensor mode is switched is one of menu items, and the user can change the priority setting 501 from the menu screen. The priority setting 501 has a setting value of either one of sensor mode priority 502 (first priority mode) and resolution priority 503 (second priority mode).

In a case where the priority setting 501 is set to the sensor mode priority 502, each time when the user presses the assignment button to which the sensor mode switching function is assigned, the sensor mode is sequentially switched to all the setting values. Each time when the assignment button is pressed, the system control unit 50 changes the sensor mode from the currently set sensor mode in the table 401 in the order of the arrows 402*a*, 402*b*, 402*c*, and 402*d* indicating the switching path.

In a case where the priority setting 501 is set to the resolution priority 503, when it is assumed that the current setting value of the resolution be "3840×2160", the sensor mode is not switched to "Super16mmCrop". This is because the sensor mode "Super16mmCrop" does not correspond to the resolution "3840×2160". Each time when the user presses the assignment button to which the sensor mode switching function is assigned, the system control unit 50 switches the sensor mode between the sensor modes corresponding to the resolution "3840×2160". Each time when the assignment button is pressed, the system control unit 50 changes the sensor mode from the currently set sensor mode in the table 401 in the order of the arrows 403*a* and 403*b* indicating the switching path. As a result, the currently set resolution is maintained.

For example, in the table 401 in FIG. 4, it is assumed that the setting of the current sensor mode be "35mmCrop", setting of the photographable resolution be "4096×2160", and the priority setting 501 be set to the resolution priority 503. When the user presses the assignment button to which the sensor mode switching function is assigned, in a case of the sensor mode priority 502, although the sensor mode is changed to "Super16mmCrop", the resolution "4096×2160" is not maintained. On the other hand, in a case where the priority setting 501 is the resolution priority 503, the sensor mode is changed to "FULL size" in which the photographable resolution can be maintained.

In the resolution priority 503, even if the user tries to change the sensor mode to "Super16mmCrop", the sensor mode is changed in the order of the switching path of the arrows 403*a* and 403*b*, and is not set to "Super16mmCrop". Therefore, there is a possibility that the user tries to set the sensor mode to "Super16mmCrop" and presses the assignment button the plurality of times within the predetermined time.

In a case where the operation for pressing the assignment button is performed a plurality of times within the predetermined time in the resolution priority 503, the system control unit 50 displays the confirmation screen 305 for confirming to the user whether or not to switch the priority setting 501 from the sensor mode priority 502 to the resolution priority 503.

In a case where the priority setting 501 is set to the resolution priority 503, the confirmation screen 305 displays information for notifying that switching to some sensor modes is restricted. Furthermore, the confirmation screen 305 displays information for notifying that switching to the sensor mode, in which switching is restricted in the resolution priority 503, can be performed, by switching the priority setting 501 to the sensor mode priority 502. Therefore, the user can recognize a coping method in a case where the user desires to perform switching to the sensor mode in which the switching is restricted in the resolution priority 503, by confirming the notification information on the confirmation screen 305.

The confirmation screen 305 displays an acceptance button 307 (OK button) used to accept switching of the priority setting 501 from the resolution priority 503 to the sensor mode priority 502 and a cancel button 306 (Cancel button) for canceling. The user can end the display of the confirmation screen 305 by selecting the cancel button 306 or the acceptance button 307 on the confirmation screen 305.

When the cancel button 306 is selected, the system control unit 50 ends the display of the confirmation screen 305, without switching the priority setting 501 from the sensor mode priority 502 to the resolution priority 503. When the acceptance button 307 is selected, the system control unit 50 switches the priority setting 501 from the resolution priority 503 to the sensor mode priority 502 and ends the display of the confirmation screen 305.

The user can select the cancel button 306 or the acceptance button 307 displayed on the confirmation screen 305, by the operation for pressing the assignment button to which the sensor mode switching function is assigned. For example, the operation for selecting the acceptance button 307 is an operation for pressing the assignment button for a short time, and the operation for selecting the cancel button 306 is an operation for pressing the assignment button for a long time.

A method by which two buttons on a screen can be distinguished and selected, according to a time when the assignment button to which various functions are assigned is pressed (whether long press or short press) is not limited to the confirmation screen 305 in FIG. 3C and can be applied to a screen including various types of notification information. The notification information is not limited to a notification that the setting of the resolution is also changed by changing the setting of the sensor mode and may include a notification that another related setting is changed, by changing setting of a recording format of an image file, setting regarding a gamma, or the like.

Control for ending the display of the notification screen 303 and the confirmation screen 305 by pressing the assignment button to which the sensor mode switching function is assigned may be limited to a case where the notification screen 303 and the confirmation screen 305 are displayed by pressing the assignment button.

The system control unit 50 may determine whether or not to display the notification screen 303, depending on whether or not the icon 302 indicating the current setting value of the resolution currently set is displayed on the display unit 110. Even in a case where the setting of the resolution is changed according to the operation for changing the setting of the sensor mode, in a case where information regarding the current setting value of the resolution is displayed on the display unit 110, the system control unit 50 does not display the notification screen 303. This is because the user can confirm the setting value of the resolution without displaying the notification screen 303. On the other hand, in a case where the information regarding the current setting value of the resolution is not displayed on the display unit 110, the system control unit 50 displays the notification screen 303.

Furthermore, in a case of receiving the operation for pressing the assignment button to which the sensor mode switching function is assigned for a long time, the system control unit 50 does not display the notification screen 303, even in a case where the setting of the resolution is changed by changing the setting of the sensor mode. In this case, the system control unit 50 performs control so as not to display the notification screen 303 and changes the setting of the sensor mode to a setting value based on the user operation. In a case of accepting in advance that the resolution is automatically switched, the user can reduce the risk of the occurrence of the blurring in the image, by saving time and effort to end the display the notification screen 303, by pressing the assignment button for a long time.

Figure 6:
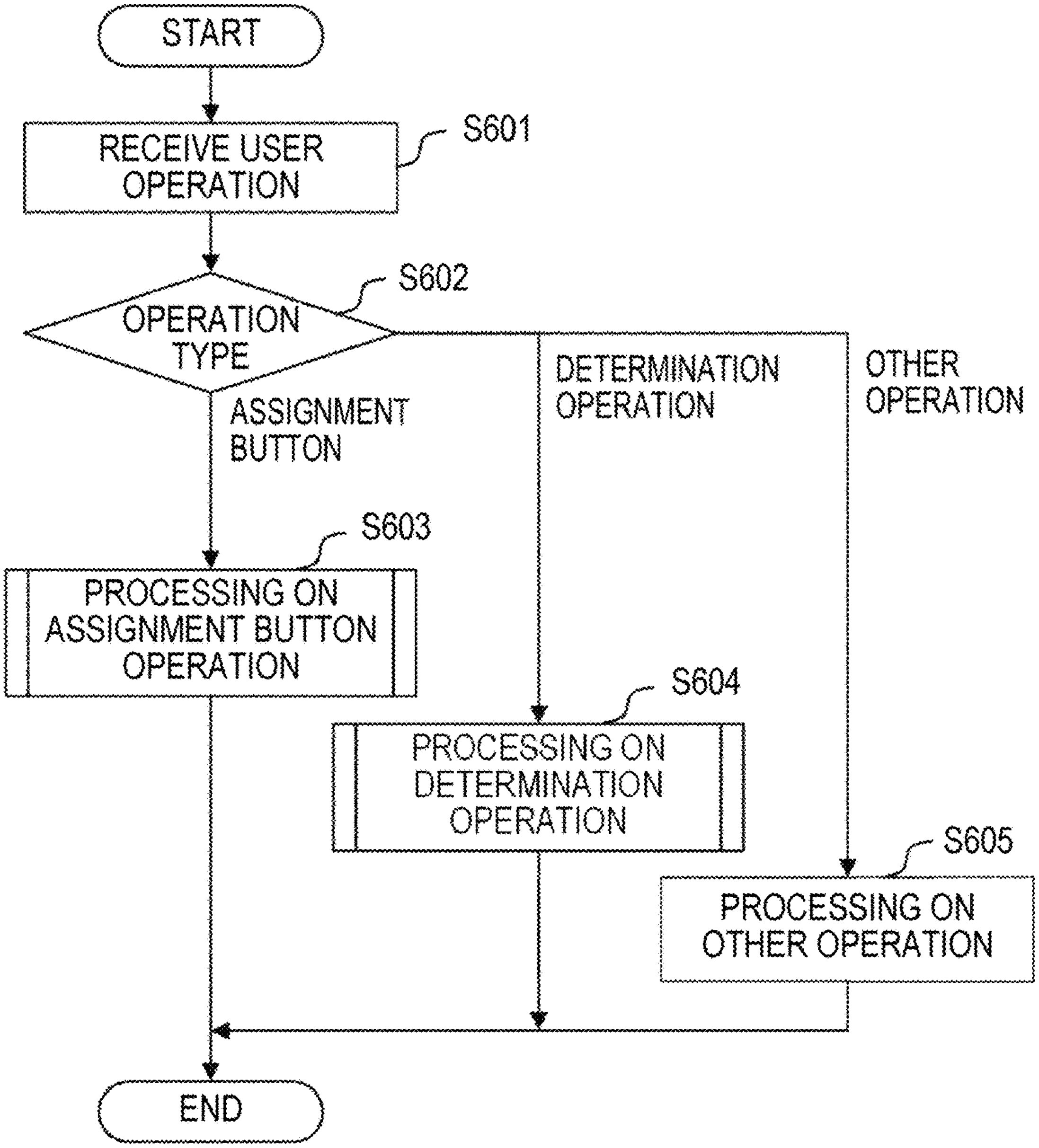
FIG. 6 is a flowchart illustrating processing of the camera for a user operation.

FIG. 6 is a flowchart illustrating processing of the camera 10 for the user operation. The processing illustrated in FIG. 6 is achieved by the system control unit 50 reading the program stored in the nonvolatile memory 111, developing the program on the system memory 113, and executing the program.

In step S601, the system control unit 50 receives an operation from the user via the operation unit 115 or the touch panel 116.

In step S602, the system control unit 50 determines the type of the operation received in step S601. In a case where the user operation is the operation on the assignment button to which the sensor mode switching function is assigned, the processing proceeds to step S603. In a case where the user operation is the determination operation such as the operation for pressing the determination button (SET key) or the operation for pressing a touch button on the touch panel 116, the processing proceeds to step S604. In a case where the user operation is other operations, the processing proceeds to step S605.

In step S603, the system control unit 50 executes processing in a case of receiving the operation on the assignment button to which the sensor mode switching function is assigned. Details of the processing in step S603 is illustrated in the flowchart in FIG. 7. In step S604, the system control unit 50 executes processing on the determination operation. Details of the processing in step S604 is illustrated in the flowchart in FIG. 8.

In step S605, the system control unit 50 executes processing on an operation determined as the other operation in step S602. The system control unit 50 executes processing according to the operation received from the user and a state of the camera 10.

Figure 7:
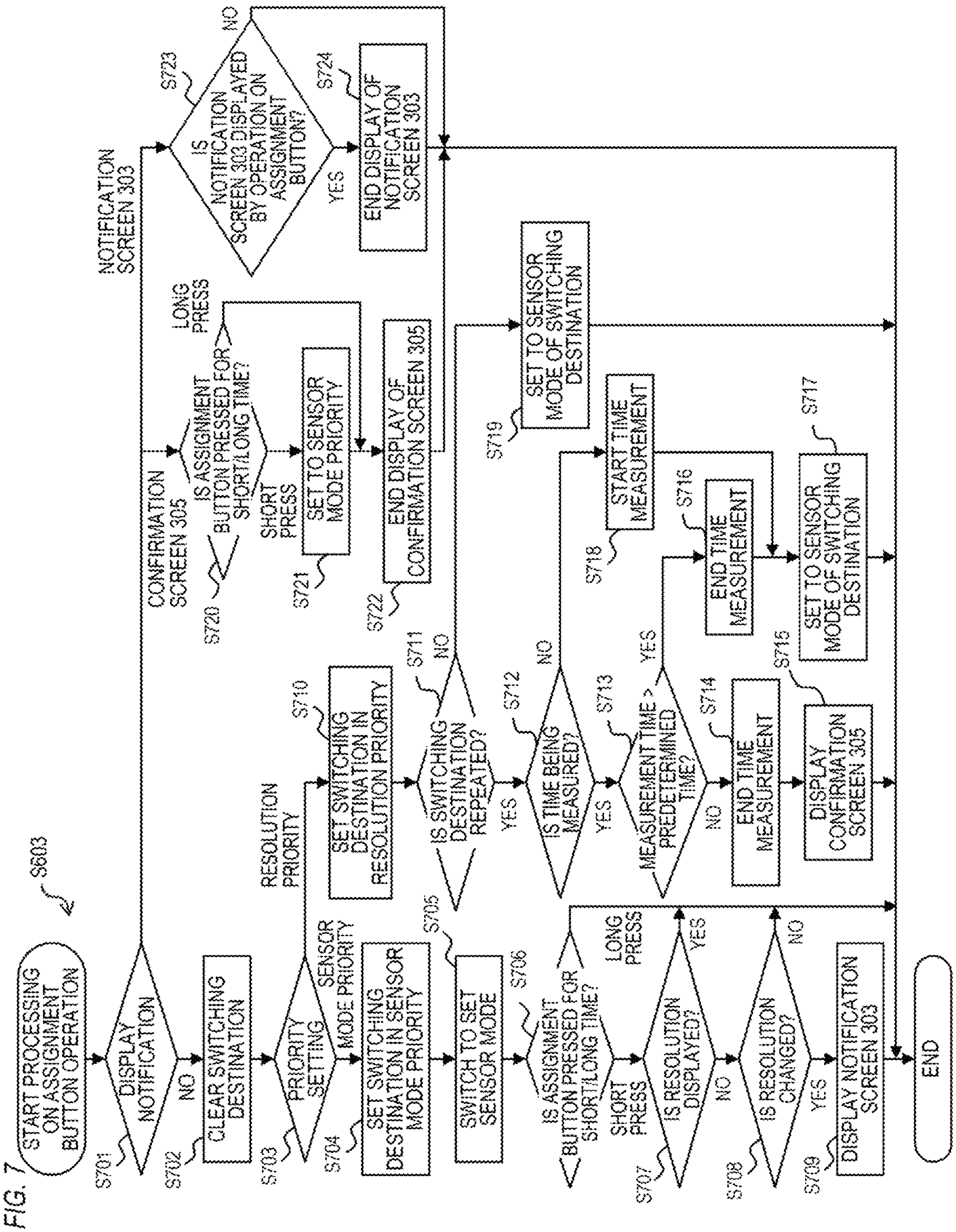
FIG. 7 is a flowchart illustrating processing for an assignment button operation.

FIG. 7 is a flowchart illustrating processing for the assignment button to which the sensor mode switching function is assigned. The processing illustrated in FIG. 7 is achieved by the system control unit 50 reading the program stored in the nonvolatile memory 111, developing the program on the system memory 113, and executing the program.

In step S701, the system control unit 50 determines whether or not the notification (notification screen 303 in FIG. 3B or confirmation screen 305 in FIG. 3C) is displayed on the display unit 110. In a case where the notification is not displayed, the processing proceeds to step S702. In a case where the confirmation screen 305 is displayed, the processing proceeds to step S720. In a case where the notification screen 303 is displayed, the processing proceeds to step S723.

In step S702, the system control unit 50 initializes a variable (hereinafter, described as switching destination variable) that holds a setting value of a switching destination of the sensor mode. The switching destination variable of the sensor mode is stored in the system memory 113 and can be read from the processing in the other steps.

In step S703, the system control unit 50 determines whether the setting value of the priority setting 501 is the sensor mode priority 502 or the resolution priority 503. In a case where the sensor mode priority 502 is set, the processing proceeds to step S704. In a case where the resolution priority 503 is set, the processing proceeds to step S710.

In step S704, the system control unit 50 sets a candidate of the switching destination of the sensor mode in a case where the priority setting 501 is the sensor mode priority 502, to the switching destination variable. For example, in the sensor mode priority 502, the setting value of the sensor mode is changed in the order of the arrows 402*a*, 402*b*, 402*c*, and 402*d* indicating the switching path in FIG. 4.

In step S705, the system control unit 50 switches the sensor mode to a sensor mode set to the switching destination variable. Furthermore, the system control unit 50 holds the setting value of the resolution before switching the sensor mode as a resolution variable. The resolution variable is stored in the system memory 113 and can be read from the processing in the other steps.

In a case where the resolution before switching the sensor mode is not maintained after switching the sensor mode, the system control unit 50 automatically selects and sets a resolution after switching, from among photographable resolutions corresponding to a sensor mode after switching in the table 401. Which resolution is automatically set after switching the sensor mode can be determined in advance in the program stored in the nonvolatile memory 111.

In step S706, the system control unit 50 determines whether the operation on the assignment button to which the sensor mode switching function is assigned is short press or long press. In a case where the operation on the assignment button is the short press, the processing proceeds to step S707. In a case where the operation on the assignment button is the long press, the processing illustrated in FIG. 7 ends.

In step S707, the system control unit 50 determines whether or not information regarding the currently set resolution is displayed on the display unit 110. For example, it is sufficient for the system control unit 50 to determine whether or not the icon 302 indicating the setting value of the resolution described in FIG. 3A is displayed. In a case where the information regarding the resolution is not displayed, the processing proceeds to step S708. In a case where the information regarding the resolution is displayed, the system control unit 50 switches the sensor mode to the sensor mode set to the switching destination variable and ends the processing illustrated in FIG. 7.

In step S708, the system control unit 50 determines whether or not the resolution is changed, due to the change in the sensor mode. In a case where the resolution held in the resolution variable in step S705 and the currently set resolution are different, the system control unit 50 can determine that the resolution is changed. In a case where the resolution is changed, the processing proceeds to step S709. In a case where the resolution is not changed, the processing illustrated in FIG. 7 ends.

In step S709, the system control unit 50 displays the notification screen 303 on the display unit 110. Furthermore, the system control unit 50 turns on a notification display flag. The notification display flag is a flag indicating whether or not the notification screen 303 is displayed by the operation on the assignment button to which the sensor mode switching function is assigned. The notification display flag is set to on in a case where the notification screen 303 is displayed by the operation on the assignment button to which the sensor mode switching function is assigned. The notification display flag is stored in the system memory 113 and can be read from the processing in the other steps.

In step S710, the system control unit 50 sets a candidate of the switching destination of the sensor mode in a case where the priority setting 501 is the resolution priority 503, to the switching destination variable. For example, in the resolution priority 503, the setting value of the sensor mode is changed in the order of the arrows 403*a* and 403*b* indicating the switching path in FIG. 4.

In step S711, the system control unit 50 determines whether or not the sensor mode set to the switching destination variable by performing the plurality of times of operation on the assignment button within the predetermined time is repeatedly set to the same setting value within the predetermined time. For example, in a case of the resolution priority 503, the system control unit 50 changes the sensor mode in the order of the switching path of the arrows 403*a* and 403*b* in the table 401. Therefore, each time when the user presses the assignment button, the sensor mode is alternately set to "FULL size" and "35mmCrop". Since the sensor mode is not set to "Super16mmCrop" even if the user tries to set the sensor mode to "Super16mmCrop", the user presses the assignment button the plurality of times within the predetermined time. As a result, to the sensor mode of the switching destination, the same setting value is repeatedly set.

In a case where the same setting value is repeatedly set to the sensor mode of the switching destination within the predetermined time, the processing proceeds to step S712. In a case where the same setting value is not repeatedly set to the sensor mode of the switching destination within the predetermined time, the processing proceeds to step S719.

In step S712, the system control unit 50 determines whether or not the predetermined time used for the determination in step S711 is measured. In a period from a time when the measurement of the time is started in step S718 to a time when the measurement of the time ends in steps S714 and S716, it is determined that the time is being measured.

The system control unit 50 uses a start time variable, in order to determine whether or not the time is being measured. The system control unit 50 stores a time acquired from the system timer 114 in the start time variable when measurement of the time is started in step S718. Furthermore, the system control unit 50 clears (initializes) the start time variable when the measurement of the time ends in steps S714 and S716. As long as the time information is stored in the start time variable, the system control unit 50 can determine that the time is being measured.

The time when the measurement is started in step S718 is used to determine whether or not the switching destination of the sensor mode is set to the same setting value twice or more within the predetermined time in step S711. Specifically, in a case where the sensor mode is changed in the order of the switching path of the arrows 403*a* and 403*b* in the table 401 in FIG. 4, the sensor mode is switched to "FULL size" and "35mmCrop", each time when the assignment button is pressed. In a case where the current sensor mode is "35mmCrop", the sensor mode is set to "35mmCrop" twice, by pressing the assignment button twice. Furthermore, in a case where the assignment button is pressed three times, the sensor mode is set to "FULL size" twice.

In a case where it is determined in step S712 that the time is being measured, the processing proceeds to step S713. In a case where it is determined that the time is not being measured, the processing proceeds to step S718.

In step S713, the system control unit 50 determines whether or not the measurement time when the measurement is started in step S718 exceeds the predetermined time. The predetermined time can be determined in advance in the program stored in the nonvolatile memory 111. In a case where the measurement time does not exceed the predetermined time, the processing proceeds to step S714. In a case where the measurement time exceeds the predetermined time, the processing proceeds to step S716.

In step S714, the system control unit 50 ends the measurement of the time and initializes the start time variable. In step S715, the system control unit 50 displays the confirmation screen 305 on the display unit 110.

In step S716, the system control unit 50 ends the measurement of the time and initializes the start time variable. In step S717, the system control unit 50 sets the sensor mode to the sensor mode set to the switching destination variable.

In step S718, the system control unit 50 starts the measurement of the time. The system control unit 50 acquires the time from the system timer 114 and stores the time in the start time variable. The start time variable is stored in the system memory 113 and can be read from the processing in the other steps.

In step S719, the system control unit 50 sets the sensor mode to the sensor mode set to which the switching destination variable.

In step S720, the system control unit 50 determines whether the operation on the assignment button to which the sensor mode switching function is assigned is short press or long press. In a case where the operation on the assignment button is the short press, the system control unit 50 determines that the acceptance button 307 of the confirmation screen 305 is selected and proceeds to step S721. In a case where the operation on the assignment button is the long press, the system control unit 50 determines that the cancel button 306 of the confirmation screen 305 is selected and proceeds to step S722.

In step S721, the system control unit 50 sets the priority setting 501 to the sensor mode priority 502. In step S722, the system control unit 50 ends the display of the confirmation screen 305.

In step S723, the system control unit 50 determines whether or not the notification screen 303 is displayed by the operation on the assignment button to which the sensor mode switching function is assigned. In a case where the notification display flag set in step S709 is turned on, the system control unit 50 can determine that the notification screen 303 is displayed by the operation on the assignment button. In a case where the notification screen 303 is displayed by the operation on the assignment button, the system control unit 50 turns off the notification display flag and proceeds to step S724. In a case where the notification screen 303 is displayed without using the assignment button, the processing illustrated in FIG. 7 ends. In step S724, the system control unit 50 ends the display of the notification screen 303.

Figure 8:
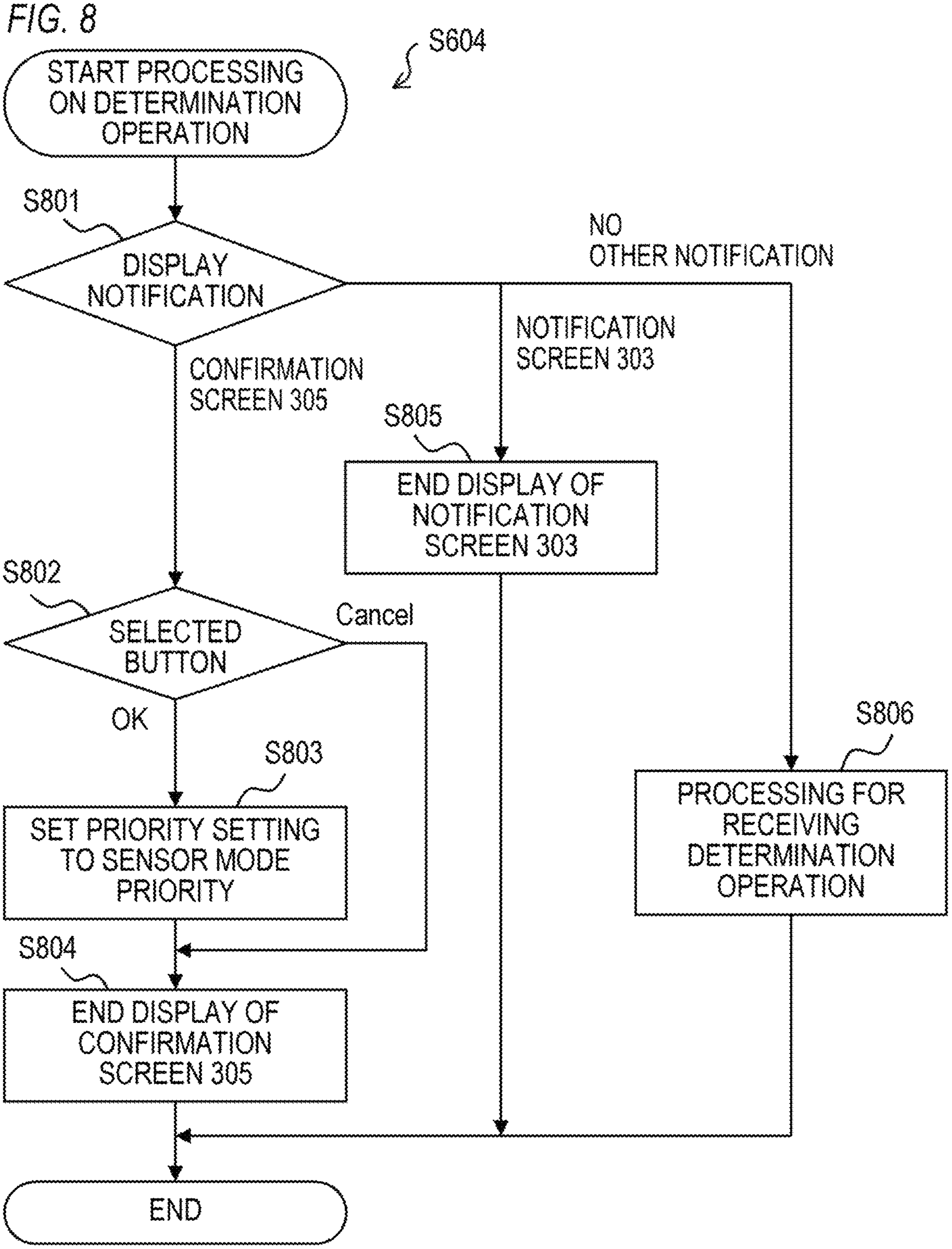
FIG. 8 is a flowchart illustrating processing for a determination operation.

FIG. 8 is a flowchart illustrating processing for the determination operation. The determination operation includes the operation for pressing the determination button (SET key), the operation for pressing the touch button on the touch panel 116, or the like. The processing illustrated in FIG. 8 is achieved by the system control unit 50 reading the program stored in the nonvolatile memory 111, developing the program on the system memory 113, and executing the program.

In step S801, the system control unit 50 determines whether or not the notification (notification screen 303 in FIG. 3B or confirmation screen 305 in FIG. 3C) is displayed on the display unit 110. In a case where the confirmation screen 305 is displayed, the processing proceeds to step S802. In a case where the notification screen 303 is displayed, the processing proceeds to step S805. In a case where the notification is not displayed or a notification other than the notification screen 303 and the confirmation screen 305 is displayed, the processing proceeds to step S806.

In step S802, the system control unit 50 determines whether the button selected on the confirmation screen 305 by the determination operation is the cancel button 306 (Cancel button) or the acceptance button 307 (OK button). In a case where the acceptance button 307 is selected, the processing proceeds to step S803. In a case where the cancel button 306 is selected, the processing proceeds to step S804.

In step S803, the system control unit 50 sets the priority setting 501 to the sensor mode priority 502. In step S804, the system control unit 50 ends the display of the confirmation screen 305. In step S805, the system control unit 50 ends the display of the notification screen 303, in response to the determination operation of the user for selecting the acceptance button 304 on the notification screen 303.

In step S806, the system control unit 50 executes the processing on the determination operation, according to a screen of another notification or the like displayed on the display unit 110.

According to the embodiment, in a case where the notification screen 303 or the confirmation screen 305 is displayed by the operation on the assignment button to which the sensor mode switching function is assigned, the user can end the display of these screens, by pressing the assignment button again. That is, since the user can end the display of the notification screen 303 and the confirmation screen 305, without operating the operation unit 115 or the touch panel 116 other than the assignment button, the user can maintain the imaging posture and prevent the blurring of the captured image. In the above description, it has been assumed that only the acceptance button 304 (OK button) be displayed on the notification screen 303. However, not only the OK button but also the cancel button may be displayed. In this case, the notification screen 303 is displayed in a state where the OK button is initially selected. Note that the setting of the sensor mode is not changed, at a timing when the notification screen 303 is displayed. Then, when the OK button is selected by operating the assignment button again, after the display of the notification screen 303, the setting of the sensor mode is changed at this timing, and the display of the notification screen 303 ends. On the other hand, after the display of the notification screen 303, in a case where the cancel button is selected, by the operation on the direction key and the SET key, the touch operation, or the like, the display of the notification screen 303 ends, without changing the setting of the sensor mode.

In the present invention, the program that implements one or more functions of the embodiment may be supplied to a system or a device via a network or a non-transitory storage medium. One or more processors of a computer of the system or the device can implement each function according to the embodiment, by reading and executing the supplied program. Furthermore, the operation of the camera 10 can be realized by not only the operation with the operation unit 115 mounted on the camera 10 but also a remote operation, such as an operation via the network or an operation with a remote controller. The program and a storage medium that stores the program are included in the present invention.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present invention are also included in the present invention. The present invention also includes other configurations obtained by suitably combining various features of the embodiment.

According to the present invention, it is possible to provide an imaging apparatus that can end a notification screen while a user fixes and holds a camera.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-089317, filed on May 31, 2024, which is hereby incorporated by reference herein in its entirety.

What is claimed is:

1. An imaging apparatus comprising:

a first operation member configured to change first setting;

a processor; and a memory storing a program which, when executed by the processor, causes the imaging apparatus to:

execute notification processing for displaying notification information that notifies a user that second setting different from the first setting is changed in a case where the second setting is changed by changing the first setting, and execute control processing for performing control so as to change the first setting, according to an operation on the first operation member in a state where the notification information is not displayed and performing control so as to end display of the notification information, without changing the first setting, according to the operation on the first operation member in a state where the notification information is displayed.

2. The imaging apparatus according to claim 1, wherein the first operation member is an operation member to which a function for changing the first setting is assigned by setting of the user.

3. The imaging apparatus according to claim 1, wherein in the control processing, in a case where the notification information is displayed according to the operation on the first operation member, the display of the notification information ends, according to the operation on the first operation member again, and in a case where the operation for changing the first setting is received by a second operation member different from the first operation member and the notification information is displayed, the display of the notification information is continued, even if the first operation member is operated.

4. The imaging apparatus according to claim 3, wherein in the control processing, the control is performed so as to end the display of the notification information according to the operation on the second operation member, regardless of whether or not the notification information is displayed according to which one of the operation on the first operation member and the operation on the second operation member.

5. The imaging apparatus according to claim 3, wherein the second operation member is an operation member that is able to change the first setting on a menu screen, and in the control processing, control is performed so as to sequentially change a setting value of the first setting in a predetermined order without using the menu screen, according to the operation on the first operation member.

6. The imaging apparatus according to claim 1, wherein in the control processing, in a state where the notification information is not displayed, control is performed so that, in a case where the second setting is not changed by changing the first setting, the first setting is changed according to the operation on the first operation member, and in a case where the second setting is changed by changing the first setting, the first setting is changed according to the operation on the first operation member, and the notification information is displayed in the notification processing.

7. The imaging apparatus according to claim 1, wherein in the control processing, in a state where the notification information is not displayed, control is performed so that, in a case where the second setting is not changed by changing the first setting, the first setting is changed according to the operation on the first operation member, and in a case where the second setting is changed by changing the first setting, the notification information is displayed in the notification processing, without changing the first setting, according to the operation on the first operation member, and the first setting is changed, according to the operation on the first operation member again.

8. The imaging apparatus according to claim 1, wherein in the control processing, in a case where the first operation member is operated, in a first priority mode in which the first setting is prioritized, control is performed so that all setting values of the first setting are selectable, and in a second priority mode in which the second setting is prioritized, control is performed so that a setting value of the first setting with which a current setting value of the second setting is changed by changing the first setting is not selected, among the setting values of the first setting.

9. The imaging apparatus according to claim 8, wherein in the notification processing, in a case where a plurality of times of operation is performed on the first operation member within a predetermined time, in the second priority mode, a confirmation screen for confirming to the user whether or not to switch from the second priority mode to the first priority mode is displayed.

10. The imaging apparatus according to claim 9, wherein on the confirmation screen, a first button used to accept switching from the second priority mode to the first priority mode and a second button used to cancel switching from the second priority mode to the first priority mode are displayed, and in the control processing, when the first button is selected, the second priority mode is switched to the first priority mode, and display of the confirmation screen ends, and when the second button is selected, display of the confirmation screen ends, without switching from the second priority mode to the first priority mode.

11. The imaging apparatus according to claim 10, wherein an operation for selecting the first button is an operation for pressing the first operation member for a short time, and an operation for selecting the second button is an operation for pressing the first operation member for a long time.

12. The imaging apparatus according to claim 9, wherein in the notification processing, in the second priority mode, the confirmation screen is displayed in a case where the first setting is set to a same setting value a plurality of times by performing the plurality of times of operation on the first operation member within the predetermined time.

13. The imaging apparatus according to claim 1, wherein in the notification processing, even in a case where the second setting is changed according to the operation for changing the first setting, in a case where information regarding a setting value of the second setting is displayed on a display, the notification information is not displayed.

14. The imaging apparatus according to claim 1, wherein in the notification processing, in a case where the operation for pressing the first operation member for a long time is received, even in a case where the second setting is changed by changing the first setting, the notification information is not displayed, and the first setting is changed.

15. A method for controlling an imaging apparatus, the method comprising:

displaying notification information that notifies a user that second setting different from first setting is changed, in a case where the second setting is changed by changing the first setting; and performing control so as to change the first setting, according to an operation on a first operation member for changing the first setting in a state where the notification information is not displayed and performing control so as to end display of the notification information, without changing the first setting, according to the operation on the first operation member in a state where the notification information is displayed.

16. A non-transitory computer readable medium that stores a program, wherein the program causes a computer to execute a method for controlling an imaging apparatus, the method comprising:

displaying notification information that notifies a user that second setting different from first setting is changed, in a case where the second setting is changed by changing the first setting; and performing control so as to change the first setting, according to an operation on a first operation member for changing the first setting in a state where the notification information is not displayed and performing control so as to end display of the notification information, without changing the first setting, according to the operation on the first operation member in a state where the notification information is displayed.

* * * * *